Patented Dec. 5, 1922.

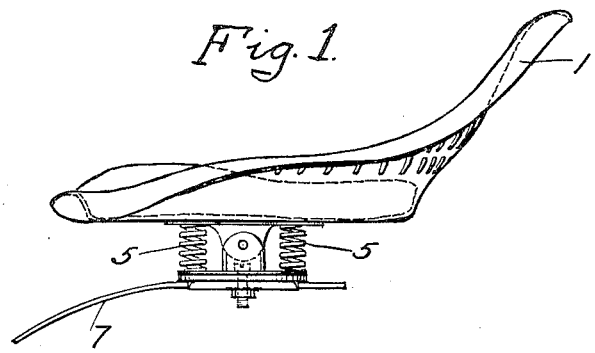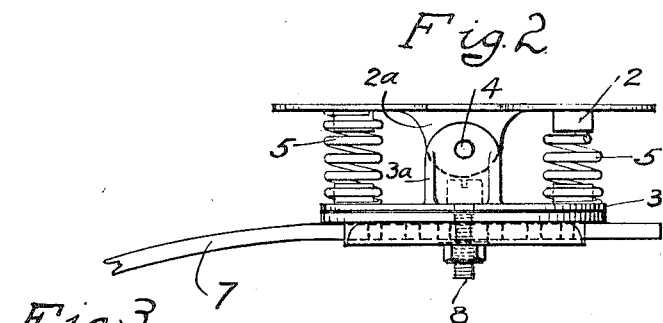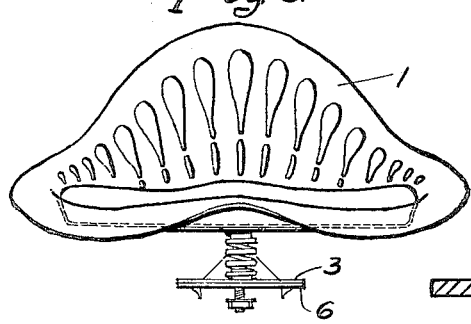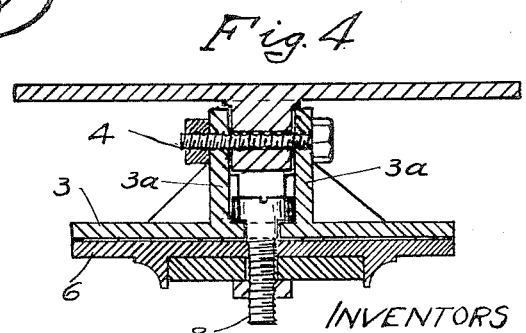

1,437,848

UNITED STATES PATENT OFFICE.

LORENZ KISOR AND RALPH W. HAMMETT, OF MINNEAPOLIS, MINNESOTA.

SEAT FOR FARM MACHINERY.

Application filed September 10, 1921. Serial No. 499,651.

*To all whom it may concern:*

Be it known that we, LORENZ KISOR and RALPH W. HAMMETT, citizens of the United States, residing at Minneapolis, in the county of Hennepin and State of Minnesota, have invented certain new and useful Improvements in Seats for Farm Machinery; and we do hereby declare the following to be a full, clear, and exact description of the invention, such as will enable others skilled in the art to which it appertains to make and use the same.

This invention relates to a rotatable and resiliently supported seat, and particularly to such a seat designed for use on agricultural machines.

It is an object of this invention to provide a seat structure by means of which the seat is rotatably and resiliently supported, the seat being mounted for forward and rearward tipping movements in its various positions of rotation.

It is a further object of the invention to provide such a structure with resilient means whereby the seat will be cushioned in both its forward and rearward tipping movements in all of its various positions of rotation.

These and other objects and advantages of the invention will be apparent from the following description made in connection with the accompanying drawings in which like reference characters refer to the same parts throughout the different views, and in which, Fig. 1 is a view in side elevation of the seat;

Fig. 2 is a view in side elevation on an enlarged scale, the seat proper being removed;

Fig. 3 is a view in front elevation of the seat; and

Fig. 4 is a vertical section taken on the line 4—4 of Fig. 2.

Referring to the drawings, a seat proper is shown which will preferably be formed of metal cast or molded to provide a comfortable shape and one having a pleasing appearance. It will be noted that the seat has a portion rising at the rear thereof so that the lower portion of the occupant's back is supported. This results in a rest for this part of the occupant's body and prevents the fatigue usually arising when a flat seat is used.

The seat 1 is supported upon a plate 2 and may be connected thereto by any suitable fastening means, such as bolts or rivets. The plate 2 has an approximately central lug $2^a$ depending from its underside which is received between upstanding ears $3^a$ formed on another plate member 3, and said lug is supported between said ears by a headed and nutted transverse pivot bolt 4 passing therethrough and through said ears. The seat and plate 2 are thus supported upon the bolt and guided by said lug, and ears for forward and rearward tipping movements. The plates 2 and 3 are also provided, forwardly and rearwardly of their central portions, with projections adapted to receive and hold in place coiled springs 5 supported upon plate 3. The plate 3 rests upon a supporting member 6 having spaced depending ribs on its lower portion arranged to fit over a resilient supporting bar 7 which extends forwardly of the seat structure and will be supported at its lower end to the machine on which the seat is used. The plate 3 is connected to the supporting member 6 and said supporting member is connected to the bar 7 by a headed and nutted bolt 8, the head of which seats on the plate 3 between the ears $3^a$. The plate 3 fits loosely about the bolt 8 and is thus rotatably mounted on the plate 6 into which belt 8 is threaded. The bar 7 may be provided with a plurality of holes so that the supporting member 6 may be secured in various positions thereon.

From the described structure it will be seen that the seat is mounted upon the bar 7 and is resiliently supported by said bar. The seat is also arranged for forward and rearward tipping movements no matter in what position of rotation it may be located. The occupant of the seat can turn to any position about the center of the bolt 8 and the seat will still be cushioned in its forward and rearward tipping movements. The jolts and jars due to the movement of the machine will be absorbed by the resilient bar 7 and the occupant will also be relieved from jolts and jars due to his movement, by the springs 5. It will also be noted that the seat will normally occupy a horizontal postion and will be returned to such position, after its tipping movements, by the springs 5.

From the above description it is seen that applicant has provided a seat of simple and yet very efficient structure. The same can be readily applied to practically all standard types of farm machinery, and can be adjusted thereon to any desired position. The fact that the seat is secured to the supporting bar by a single bolt contributes greatly to the facility of its application and renders it an easy matter to transfer the seat from one machine to another.

It will, of course, be understood that various changes may be made in the form, details and arrangement of the device without departing from the scope of applicant's invention, which generally stated, consists in the matter shown and described and set forth in the appended claims.

What is claimed is:

1. A spring seat for farm machinery having in combination a spring bar, a member embracing and adjustably mounted thereon, a supporting plate rotatably mounted on said member, a seat pivotally supported and guided on said plate for forward and rearward tipping movements, and spaced resilient means on said plate engageable by said seat in said movements.

2. A seat for farm machinery having in combination, resilient seat supporting means, a rotatable supporting means mounted thereon, securing means for connecting said rotatable means in a plurality of different positions, a seat member connected to said rotatable supporting means and journaled for oscillation in one plane relative thereto, and spaced resilient means carried by said rotatable supporting means and arranged to be contacted by said seat in its oscillating movement.

3. A seat for an agricultural machine having in combination a curved spring bar, a member having means for securing the same in a plurality of positions on said bar, a plate rotatably mounted on said member, said plate having upstanding adjacent lugs disposed substantially centrally of its upper surface, a seat having a lug depending substantially centrally thereof disposed between said lugs and pivoted thereto by a horizontal pivot, and compression springs supported on said plate forwardly and rearwardly of said lugs adapted to be contacted by said seat.

In testimony whereof we affix our signatures.

LORENZ KISOR.
RALPH W. HAMMETT.